(12) United States Patent
Jackson et al.

(10) Patent No.: US 8,152,552 B2
(45) Date of Patent: Apr. 10, 2012

(54) CARD COUPLING SYSTEM

(75) Inventors: Bradley A. Jackson, Pflugerville, TX (US); John Trevor Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 18 days.

(21) Appl. No.: 12/760,099

(22) Filed: Apr. 14, 2010

(65) Prior Publication Data

US 2011/0255233 A1    Oct. 20, 2011

(51) Int. Cl.
*H01R 13/62* (2006.01)
(52) U.S. Cl. ............... 439/326; 439/328; 439/630
(58) Field of Classification Search ......... 439/325–329, 439/630
See application file for complete search history.

(56) References Cited

U.S. PATENT DOCUMENTS

| | | | |
|---|---|---|---|
| 7,232,325 B2 * | 6/2007 | Richter et al. | 439/326 |
| 7,300,298 B2 * | 11/2007 | Kameda | 439/326 |
| 7,393,230 B2 * | 7/2008 | Yang et al. | 439/326 |
| 7,486,523 B2 * | 2/2009 | Wu et al. | 361/747 |
| 7,682,179 B1 * | 3/2010 | Tsai | 439/326 |

* cited by examiner

*Primary Examiner* — Hien Vu
(74) *Attorney, Agent, or Firm* — Haynes and Boone, LLP

(57) ABSTRACT

A card coupling system includes a card having an electrical coupler and defining a plurality of extension member coupling holes. An extension member is operable to couple to the card and includes a base. A plurality of card engagement members extend from a first edge of the base, each card engagement member operable to be located in a respective extension member coupling hole in order to couple the extension member to the card. A mounting plate extends from a second edge of the base and defines at least one mounting hole. The card may be a half size form factor card and may be coupled to a full size form factor card connector by engaging the card connector with the electrical coupler, coupling the card engagement members to respective extension member coupling holes, and securing the mounting plate to the card connector through the at least one mounting hole.

13 Claims, 7 Drawing Sheets

CARD COUPLING SYSTEM

BACKGROUND

The present disclosure relates generally to information handling systems, and more particularly to card coupling system for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs includes cards such as, for example, Peripheral Component Interconnect (PCI) Express Mini Cards ("Mini Cards"), that are coupled to the IHS in order to expand the functionality of the IHS. These cards may come in a plurality of form factors that can raise a number of issues when coupling a card that has a first form factor to a card connector that has a second form factor that is different than the first form factor.

For example, Mini Cards may be provided in a 'full size' form factor and a 'half size' form factor. IHSs with full size form factor card connectors must then use full size form factor Mini Cards while IHSs with half size form factor card connectors are restricted to using half size form factor Mini Cards, reducing flexibility with regard to the manufacture of these IHSs. One conventional solution is to provide half size form factor Mini Cards on a full size form factor Mini Card board that is perforated such that if the IHS includes a full size form factor card connector, the board may couple to the full size form factor card connector, while if the IHS includes a half size form factor card connector, the board may be broken along the perforation in order to allow the Mini Card to be coupled to the half size form factor card connector. However, such solutions can result in a waste of board and/or damage to the Mini Card if the perforated board is broken improperly.

Accordingly, it would be desirable to provide an improved card coupling system.

SUMMARY

According to one embodiment, a card coupling system includes a card having an electrical coupler and defining a plurality of extension member coupling holes, and an extension member that is operable to couple to the card, wherein the extension member includes a base, a plurality of card engagement members extending from a first edge of the base, each card engagement member operable to be located in a respective extension member coupling hole in order to couple the extension member to the card, and a mounting plate extending from a second edge of the base and defining at least one mounting hole.

BRIEF DESCRIPTION OF THE DRAWINGS

FIG. 4b is a side view illustrating an embodiment of the extension member of FIG. 4a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
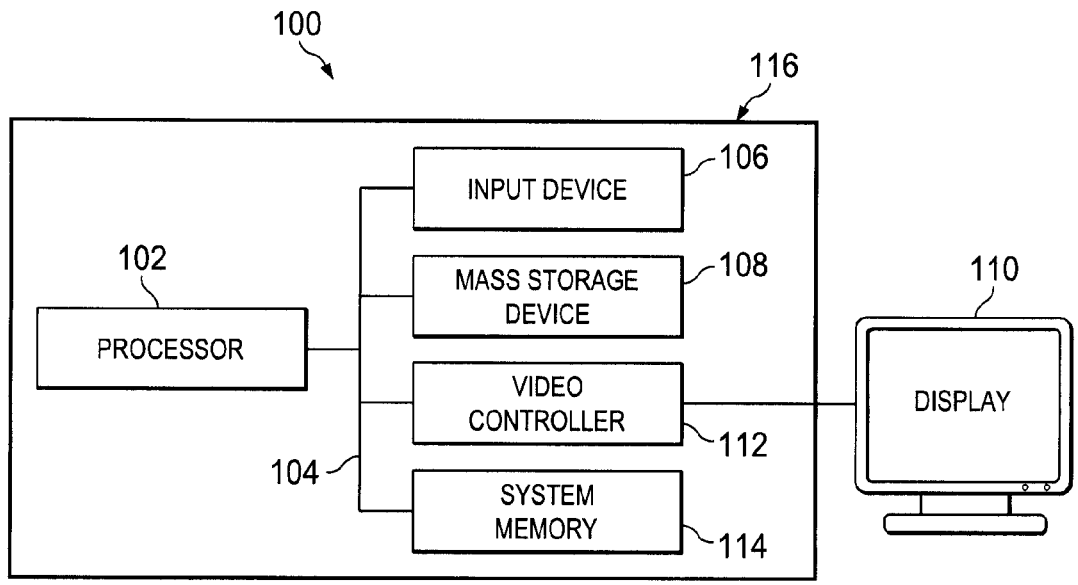
FIG. 1 is a schematic view illustrating an embodiment of an IHS.
Figure 5A:
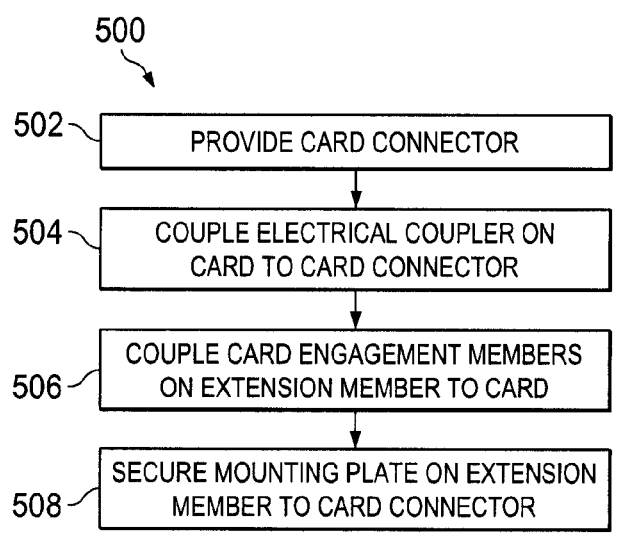
FIG. 5a is a flow chart illustrating an embodiment of a method for coupling a card to a card connector.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
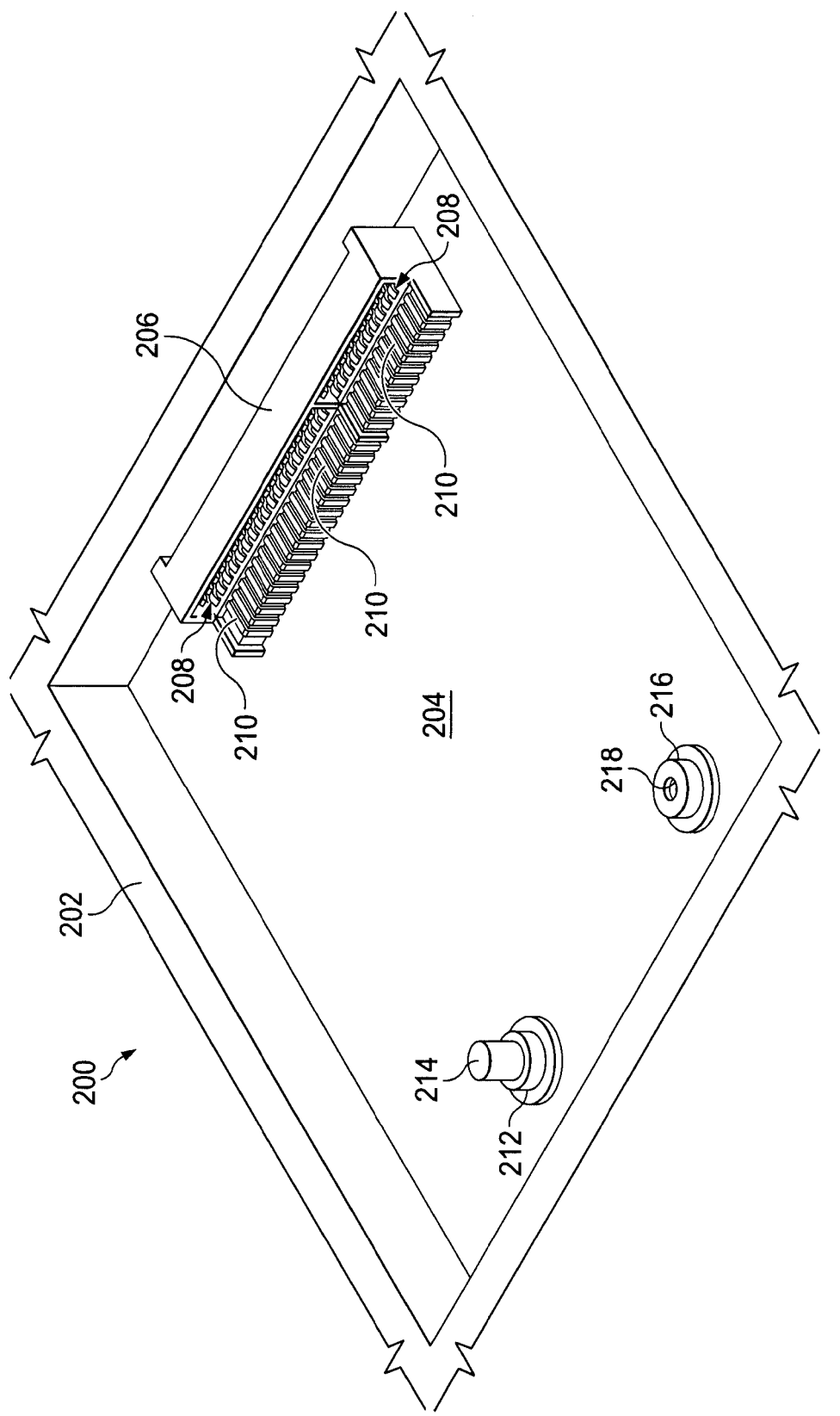
FIG. 2 is a perspective view illustrating an embodiment of a card connector.

Referring now to FIG. 2, a card connector 200 is illustrated. In an embodiment, the card connector 200 is mounted to a chassis 202 and located in a card connector channel 204 defined by the chassis 202. In an embodiment, the chassis 202 may be the chassis 116, described above with reference to FIG. 1, and may house some or all of the components of the IHS 100. In an embodiment, some or all of the card connector 200 may be electrically coupled to the processor 102, described above with reference to FIG. 1, and/or other components of the IHS 100. The card connector 200 includes a first base portion 206 that defines a card slot 208 and includes a plurality of contacts 210 that may be located on the first base portion 206, in the card slot 208, and/or in other locations known in the art. The card connector 200 also includes a second base portion 212 having a locating peg 214 extending from a top surface of the second base portion 212. The card connector 200 also includes a third base portion 216 defining a securing aperture 218 that extends into the third base portion 216 from a top surface of the third base portion 216. In an embodiment, the securing aperture 218 is a threaded securing aperture that is operable to accept a threaded fastener. In an embodiment, the second base portion 212 may be replaced by a base portion similar in structure to the third base portion 216, the third base portion 216 may be replaced by a base portion similar in structure to the second base portion, and/or base portions that include card securing features that are not illustrated may replace the second base portion and/or third base portion, as will be described in further detail below. In the illustrated embodiment, the second base portion 212 and the third base portion 216 are spaced apart from the first base portion 206 by equal amounts and are spaced apart from each other by approximately the width of the first base portion 206. However, one of skill in the art will recognize that different spacing of the first base portion 206, the second base portion 212, and the third base portion 216 of the card connector 200 may be allowed without departing from the scope of the present disclosure. In an embodiment, the card connector 200 is a full-size form factor mini card connector that is sized to couple to a full-size form factor mini card.

Figure 3:
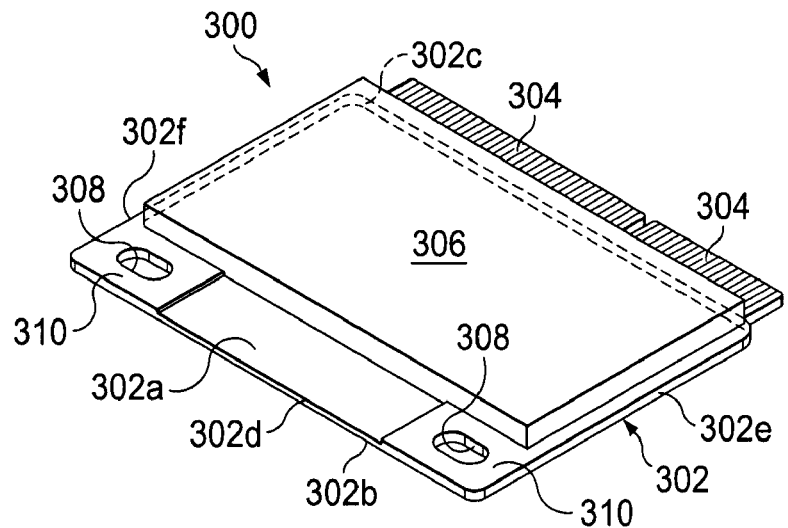
FIG. 3 is a perspective view illustrating an embodiment of a card used with the card connector of FIG. 2.

Referring now to FIG. 3, a card 300 is illustrated. In the illustrated embodiment, the card 300 is a Mini Card. However, one of skill in the art will recognize that the present disclosure may be applied to a variety of other cards known in the art. The card 300 includes a base 302 having a top surface 302a, a bottom surface 302b located opposite the base 302 from the top surface 302a, a front edge 302c extending between the top surface 302a and the bottom surface 302b, a rear edge 302d located opposite the base 302 from the front edge 302c and extending between the top surface 302a and the bottom surface 302b, and a pair of opposing side edges 302e and 302f extending between the top surface 302a, the bottom surface 302b, the front edge 302c, and the rear edge 302d. In an embodiment, the base 302 includes a Printed Circuit Board (PCB) and/or other base materials known in the art. In the illustrated embodiment, the PCI Express Mini Card is a half size form factor mini card, and one of skill in the art will recognize that a full size form factor mini card has a length (measured along the surface of either of the side edges 302e or 302f) that is approximately twice that of the half size form factor mini card. An electrical coupler 304 extends from the front edge 302c of the base 302 and includes a plurality of electrical contacts. A card component 306 is located on the top surface 302a of the base 302, coupled to the electrical coupler 304, and may include a variety of card components known in the art. A plurality of extension member coupling holes 308 are defined by the base 302, extend through the base 302 from the top surface 302a to the bottom surface 302b, and are located at the corners of the base 302 adjacent the rear edge 302d. A grounding member 310 is located adjacent each of the extension member coupling holes 308.

Figure 4A:
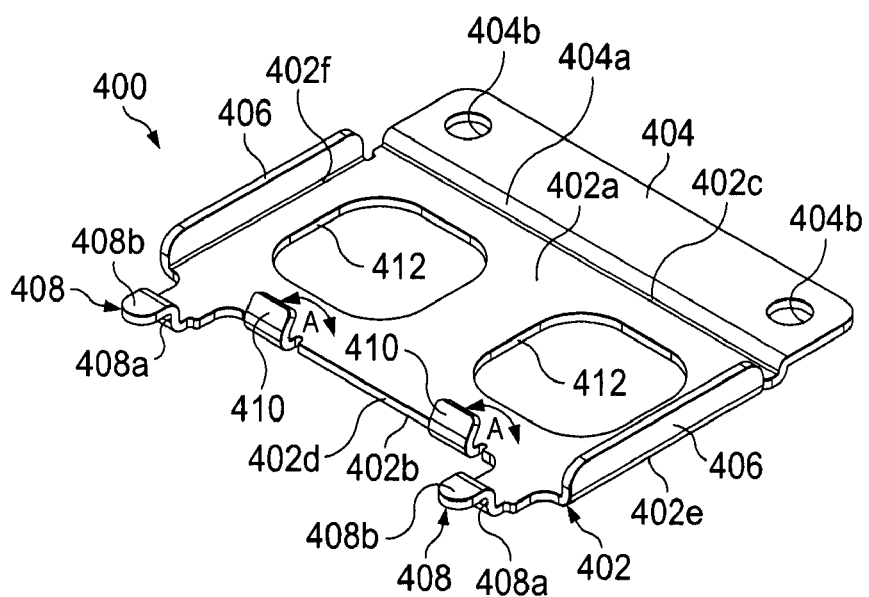
FIG. 4a is a perspective view illustrating an embodiment of an extension member used with the card of FIG. 3 and the card connector of FIG. 2.
Figure 4B:
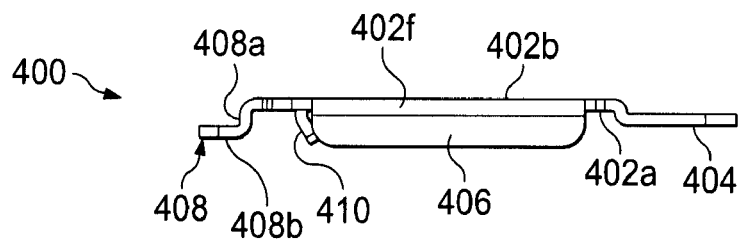

Referring now to FIGS. 4a and 4b, an extension member 400 is illustrated. The extension member 400 includes a base 402 having a top surface 402a, a bottom surface 402b located opposite the base 402 from the top surface 402a, a front edge 402c extending between the top surface 402a and the bottom surface 402b, a rear edge 402d located opposite the base 402 from the front edge 402c and extending between the top surface 402a and the bottom surface 402b, and a pair of opposing side edges 402e and 402f extending between the top surface 402a, the bottom surface 402b, the front edge 402c, and the rear edge 402d. A mounting plate 404 extends from the front edge 402d of the base 402 through a spacer portion 404a such that the mounting plate 404 is not co-planar with the base 402. A plurality of mounting holes 404b are defined by the mounting plate 404 and located in a spaced apart orientation from each other such that they are adjacent opposing edges of the mounting plate 404. In an embodiment, the mounting holes 404b are spaced apart by approximately the same distance as the second base portion 212 and the third base portion 216, described above with reference to FIG. 2. A rib member 406 extends substantially perpendicularly from each of the side edges 402e and 402f in order to, for example, add structural rigidity to the base 402. A plurality of card engagement members 408 extend from the rear edge 402d of the base 402, each card engagement member 408 including a first portion 408a that is substantially perpendicular to the base 402 and a second portion 408b that is substantially perpendicular to the first portion 402a and parallel to the base 402. The card engagement members 408 extend from the base 402 in a spaced apart orientation from each other and adjacent the side edges 402e and 402f. In an embodiment, the second portions 408b of the card engagement members 408 are spaced apart by approximately the same distance as the extension member coupling holes 308, described above with reference to FIG. 3. A plurality of card stop members 410 extend from the rear edge 402d of the base 402 and are oriented at an angle A to the base 402. A plurality of weight reducing apertures 412 are defined by the base 402, extend through the base 402 from the top surface 402a to the bottom surface 402b, and located in a spaced apart orientation from each other on the base 402.

Figure 5B:
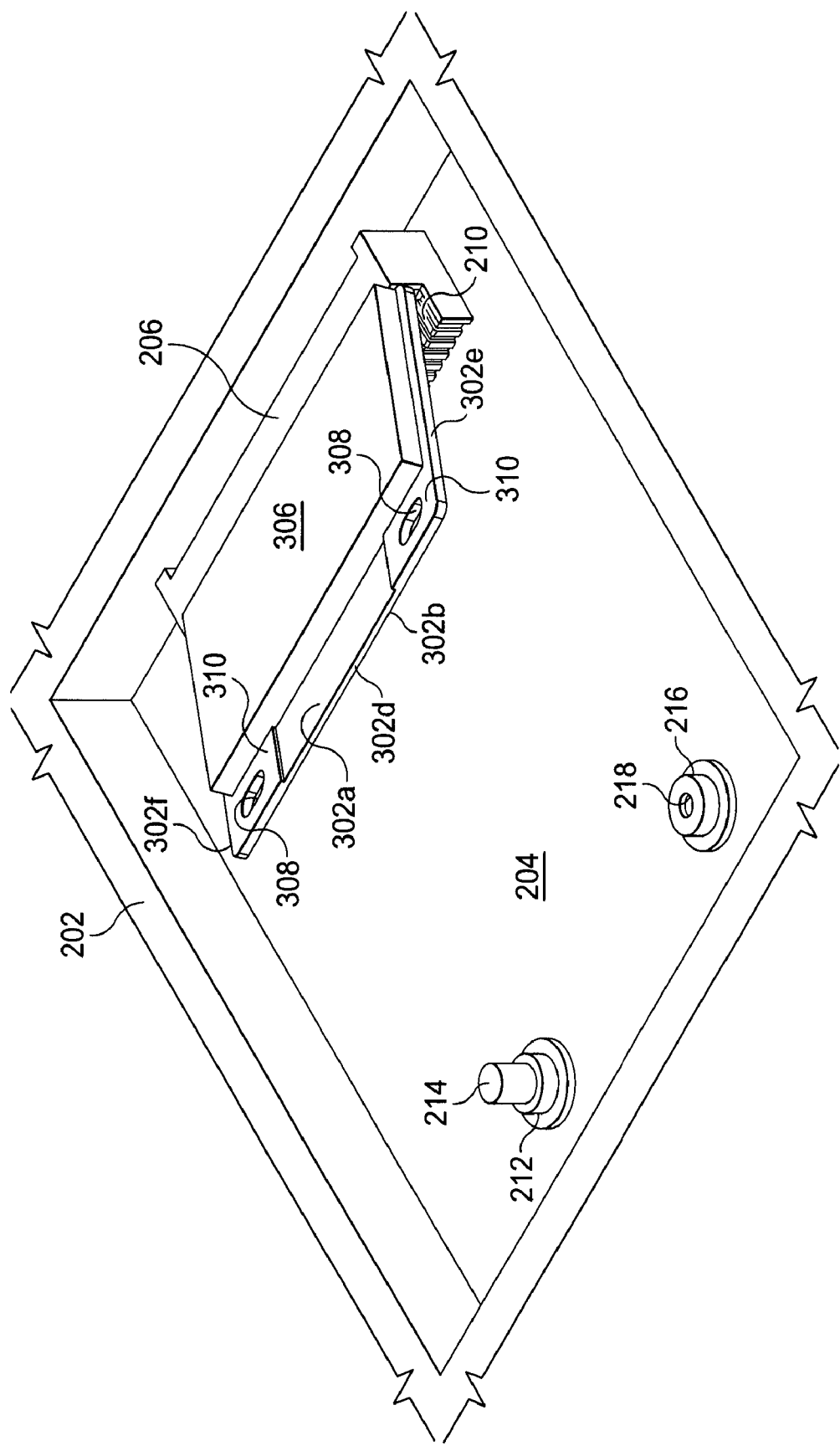
FIG. 5b is a perspective view illustrating an embodiment of the card of FIG. 3 being coupled to the card connector of FIG. 2.

Referring now to FIGS. 2, 3, 5a and 5b, a method 500 for coupling a card to a card connector is illustrated. The method 500 beings at block 502 where a card connector is provided. In an embodiment, the card connector 200, illustrated in FIG. 2, is provided. The method 500 then proceeds to block 504 where a electrical coupler on a card is coupled to the card connector. The card 300, illustrated in FIG. 3, is positioned adjacent the card connector 200 such that the electrical coupler 304 is located adjacent the card slot 208 on the first base portion 206 and the bottom surface 302b of the card 300 faces the card connector channel 204. The card 300 is then moved towards the first base portion 206 such that the electrical coupler 304 enters the card slot 208. With the electrical coupler 304 located in the card slot 208, the bottom surface 302b of the card 300 is oriented at an angle relative to the surface of the chassis 202 that is adjacent the card connector channel 204, as illustrated in FIG. 5b.

Figure 5C:
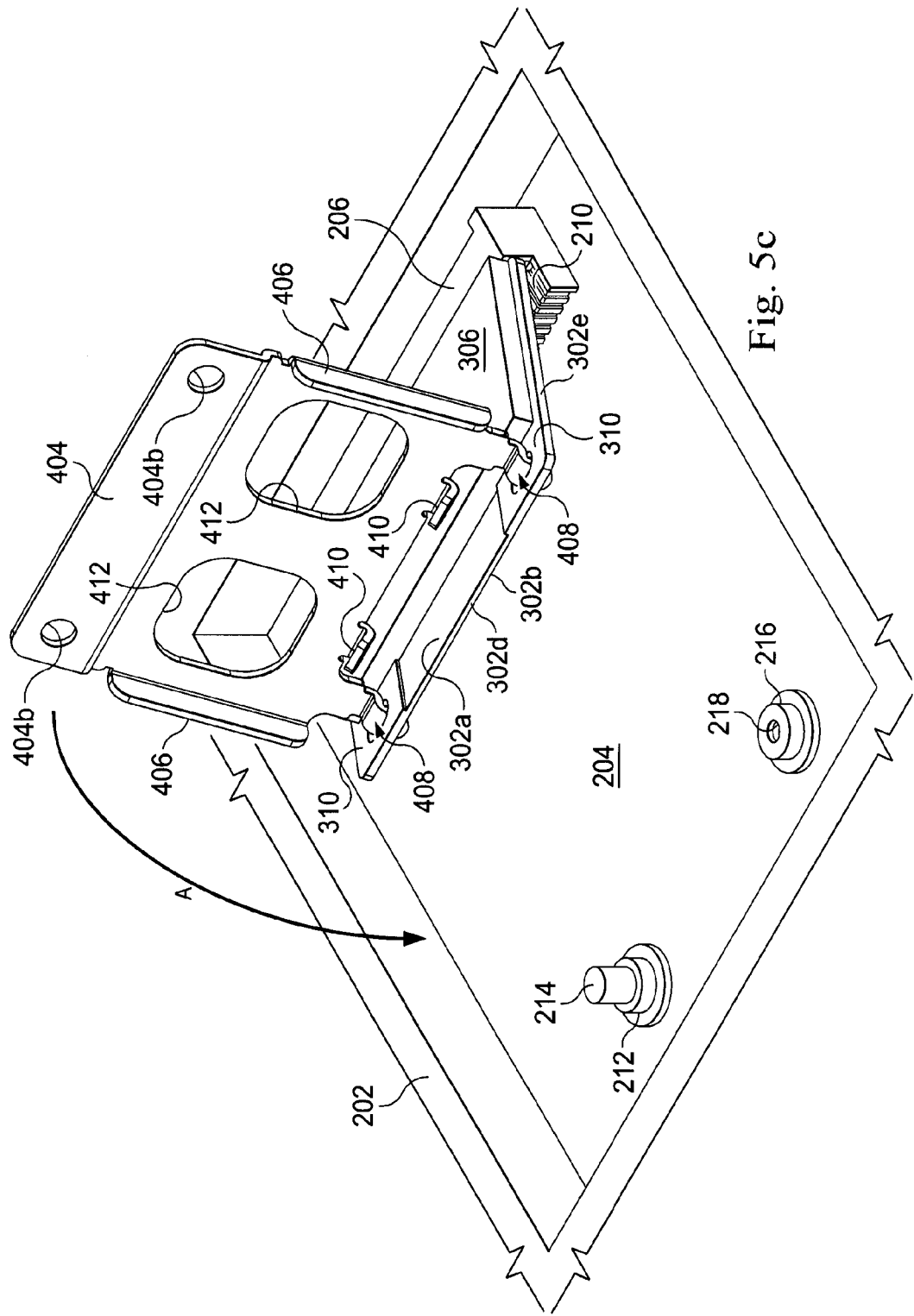
FIG. 5c is a perspective view illustrating an embodiment of the extension member of FIGS. 4a and 4b being coupled to the card and card connector of FIG. 5b.

Referring now to FIGS. 2, 3, 4a, 4b, 5a and 5c, the method 500 then proceeds to block 506 where card engagement members on an extension member are coupled to the card. The extension member 400, illustrated in FIGS. 4a and 4b, is positioned adjacent the card 300 such that card engagement members 408 are positioned adjacent respective extension member coupling holes 308 with the extension member 400 oriented approximately perpendicular to the card 300. The extension member 400 is then moved towards the card 300 such that the second portion 408b of each card engagement member 408 enters a respective extension member coupling hole 308 and the first portion 408a of each card engagement member 408 engages a respective grounding member 310 adjacent the extension member coupling hole 308, as illustrated in FIG. 5c.

Figure 5D:
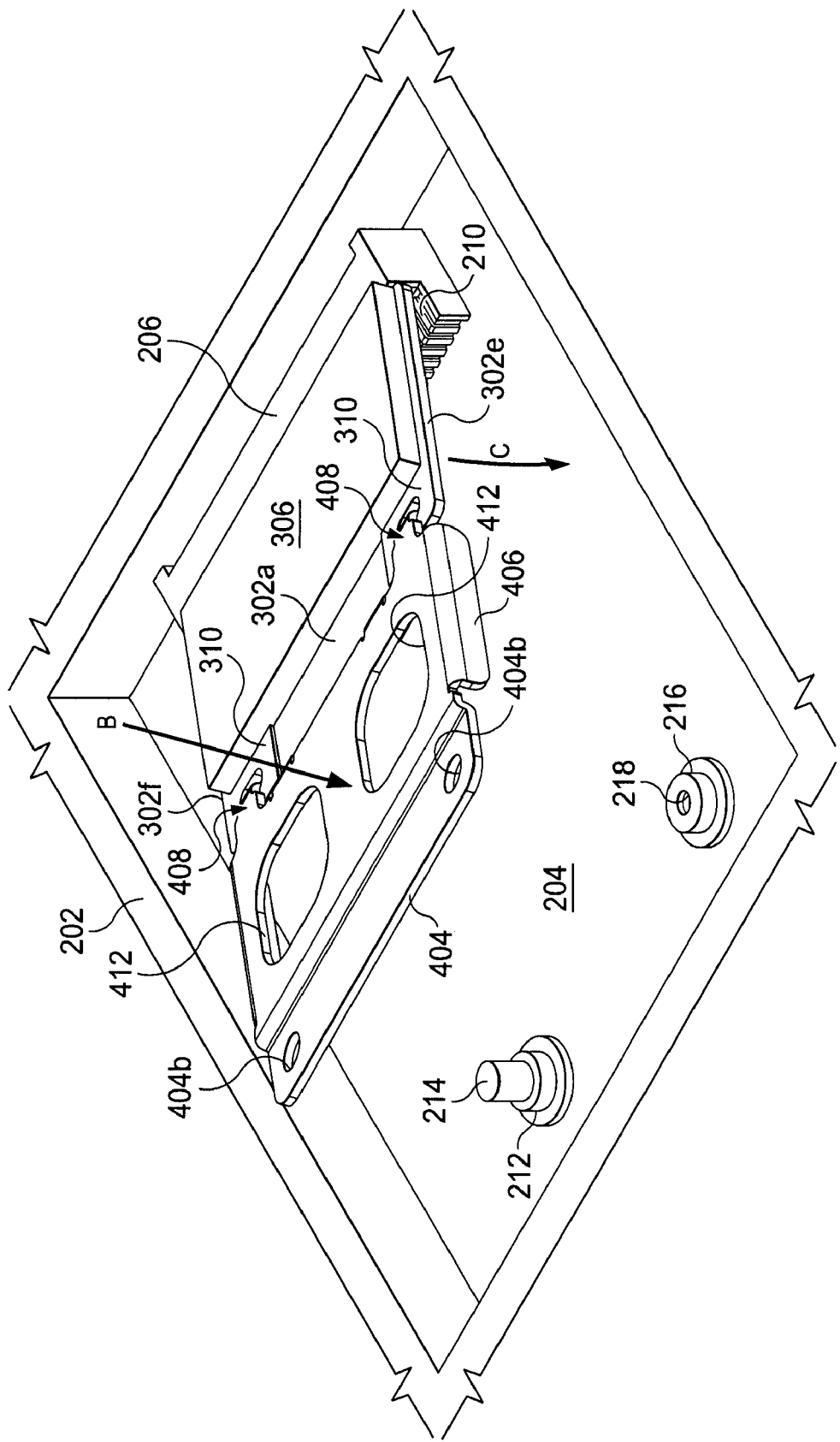
FIG. 5d is a perspective view illustrating an embodiment of the extension member, card, and card connector of FIG. 5c with the extension member rotated relative to the card.
Figure 5E:
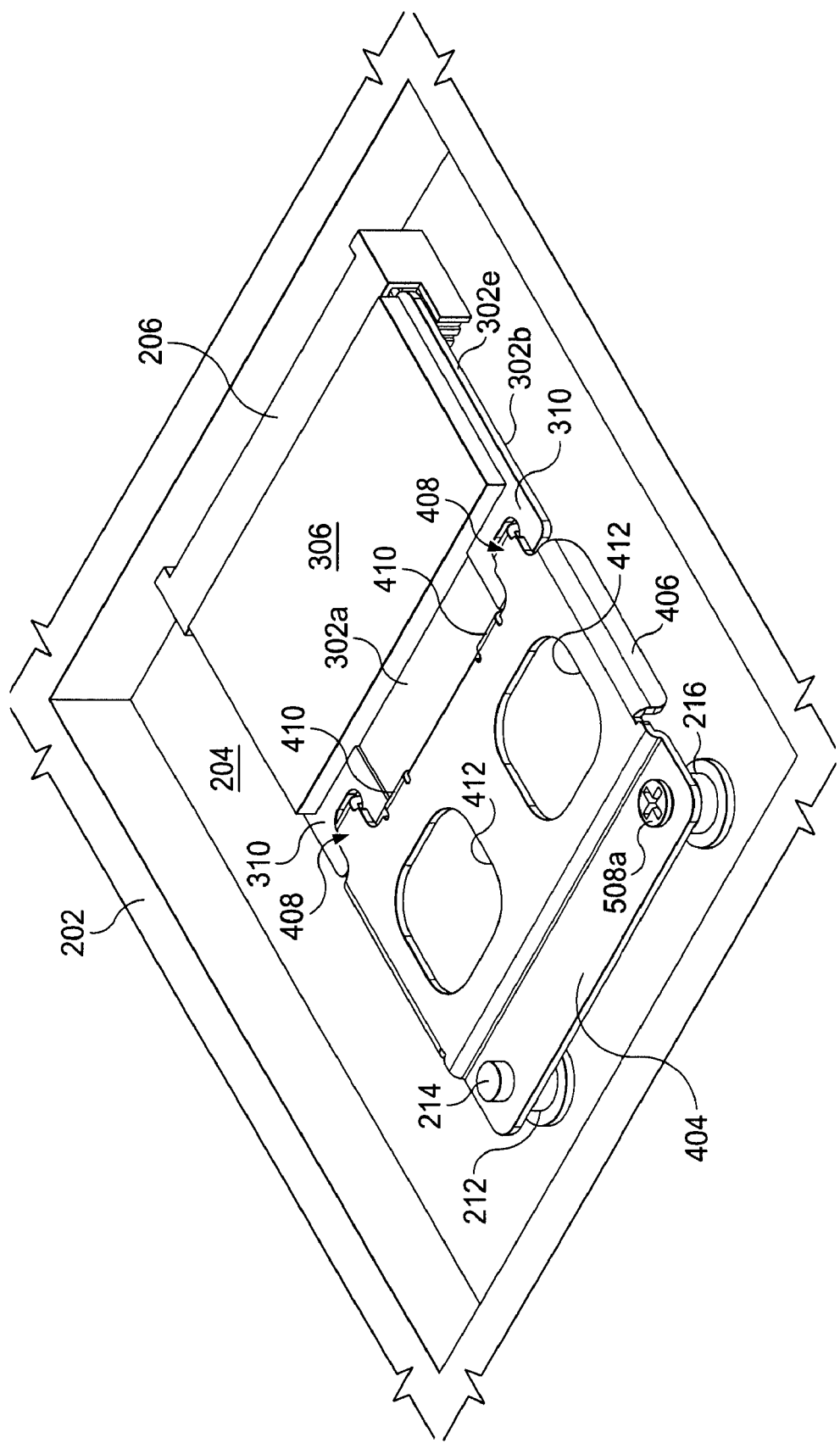
FIG. 5e is a perspective view illustrating an embodiment of the extension member, card, and card connector of FIG. 5d rotated and with the extension member secured to the card connector.

Referring now to FIGS. 2, 3, 4a, 4b, 5a, 5d and 5e, the method 500 then proceeds to block 508 where a mounting plate on the extension member is secured to the card connector. The extension member 400 is then rotated relative to the card 300 in a direction A such that the first portion 408a of each card engagement member 408 enters a respective extension member coupling hole 308, the top surface 402a of the base 402 adjacent each card engagement member 408 engages the grounding members 310, the stop members 410 engage the rear edge 302d of the card 300, and the extension member 400 is substantially co-planar with the base 302 of the card 300, as illustrated in FIGS. 5d and 5e. In an embodiment, the engagement of the stop members 410 and the rear edge 302d of the card 300 aligns the card 300 with the extension member 400 and ensures proper positioning of the card engagement members 408 in the extension member coupling holes 308. In an embodiment, the mounting holes 404b are co-planar with the extension member coupling holes 308 when the extension member 400 is in the position illustrated in FIG. 5d. In an embodiment, with the card 300 and the extension member 400 in the position illustrated in FIG. 5d, the extension member 400 and card 300 combination have dimensions that are equal to a full sized form factor card. A force B, illustrated in FIG. 5d, may then be applied to the bottom surface 402b of the extension member 400. The force B will cause the extension member 400 and the card 300 to rotate in a direction C, due to the engagement of components (e.g., the card engagement members 408, the top surface 402a, and the stop members 410) on the extension member 400 with the card 300, until the extension member 400 and the card 300 are located in the card connector channel 204, the locating peg 214 is located in a mounting hole 404b, and a mounting hole 404b is located adjacent the securing aperture 218, as illustrated in FIG. 5e. With the card 300 positioned as illustrated in FIG. 5e, the contacts on the electrical coupler 304 are urged into engagement with the contacts 210 on the first portion 206 of the card connector 200. A fastener 508a may be positioned in the mounting hole 404b and the securing aperture 218 in order to secure the extension member 400 to the card connector 200. The securing of the extension member 400 to the card connector 200 ensures continued engagement of the electrical coupler 304 with the contacts 210 on the first portion 206 of the card connector 200. Furthermore, the engagement of components (e.g., the card engagement members 408 and the top surface 402a) of the extension member 400 with the grounding members 310 and the engagement of the mounting plate 404 on the extension member 400 with the second portion 212 and the third portion 216 of the card connector 200 allows electrical components on the card 300 to be grounded. Thus, a system and method have been described that allow a half-size form factor card to be coupled to a full-size form factor card connector.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A card coupling system, comprising:
   a card comprising an electrical coupler at a front edge thereof and defining a plurality of extension member coupling holes at a rear edge thereof; and
   an extension member that is operable to couple to the rear edge of the card, wherein the extension member comprises:
   a base;
   a plurality of card engagement members extending from a first edge of the base, each card engagement member operable to be located in a respective extension member coupling hole in order to couple the extension member to the card; and
   a mounting plate extending from a second edge of the base and defining at least one mounting hole; and
   wherein a card stop member extends from the first edge of the base and operable to engage a card edge when the extension member is coupled to the card.

2. The system of claim 1, further comprising:
   a rib member extending from the base.

3. The system of claim 1, further comprising:
   a plurality of weight reducing apertures defined by the base and located on the base between the first edge and the second edge.

4. The system of claim 1, wherein the card comprises a half size form factor card, and wherein with the extension member coupled to the card, the extension member and card combination comprise dimensions that are equal to a full size form factor card.

5. The system of claim 1, wherein a grounding member is located adjacent at least one of the extension member coupling holes and is operable to engage the extension member when the card engagement member is located in the extension member coupling hole.

6. The system of claim 1, wherein the at least one mounting hole is co-planar with the extension member coupling holes when the extension member is coupled to the card.

7. An information handling system, comprising:
   a chassis;
   a processor housed in the chassis;
   a card connector mounted to the chassis and coupled to the processor;
   a card defining a plurality of extension member coupling holes at a rear edge thereof and including an electrical coupler at a front edge thereof that engages the card connector; and
   an extension member coupled to the rear edge of the card, wherein the extension member comprises:
   a base;

a plurality of card engagement members extending from a first edge of the base, wherein each card engagement member is located in a respective extension member coupling hole in order to couple the extension member to the card; and a mounting plate extending from a second edge of the base, wherein a fastener engages the mounting plate and the card connector to secure the card in the card connector; and wherein a card stop member extends from the first edge of the base and engaging a card edge.

8. The system of claim 7, further comprising:
a rib member extending from the base.

9. The system of claim 7, further comprising:
a plurality of weight reducing apertures defined by the base and located on the base between the first edge and the second edge.

10. The system of claim 7, wherein the card comprises a half size form factor card, and wherein with the extension member coupled to the card, the extension member and card combination comprise dimensions that are equal to a full size form factor card.

11. The system of claim 10, wherein the card connector comprises a full size form factor card connector.

12. The system of claim 7, wherein a grounding member is located adjacent at least one of the extension member coupling holes and engages the extension member.

13. The system of claim 7, wherein the mounting plate defines at least one mounting hole that is co-planar with the extension member coupling holes.

* * * * *